No. 879,398. PATENTED FEB. 18, 1908.
M. MITCHELL.
CORN PLANTER.
APPLICATION FILED FEB. 14, 1907.
3 SHEETS—SHEET 3.
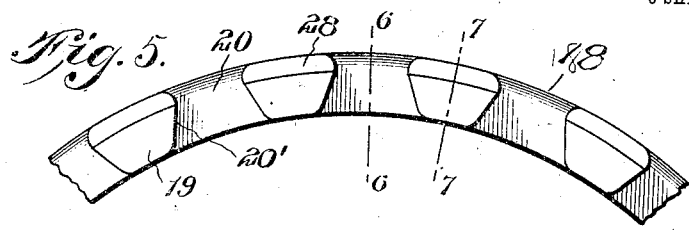
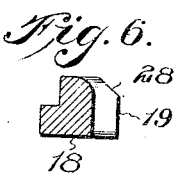
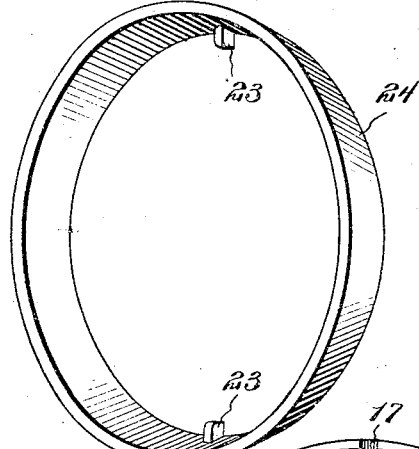
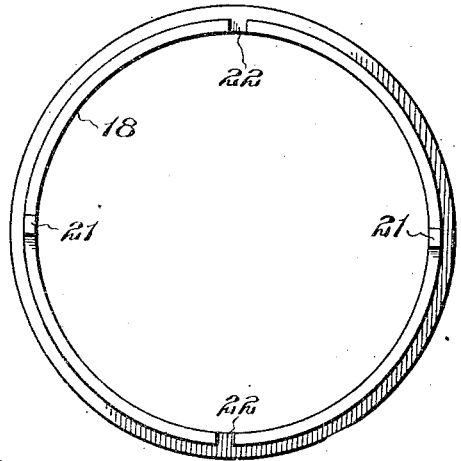
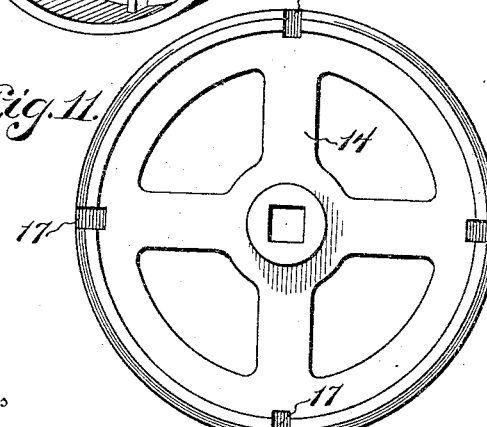
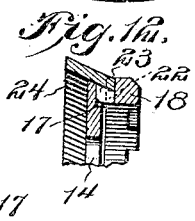
Witnesses
Louis R. Heinrichs
Inventor
Melvin Mitchell
By Victor J. Evans
Attorney

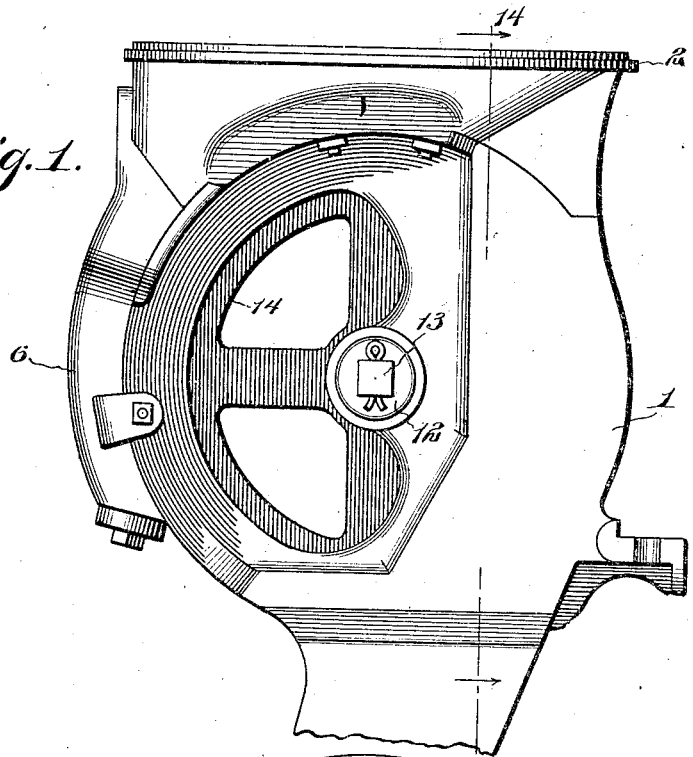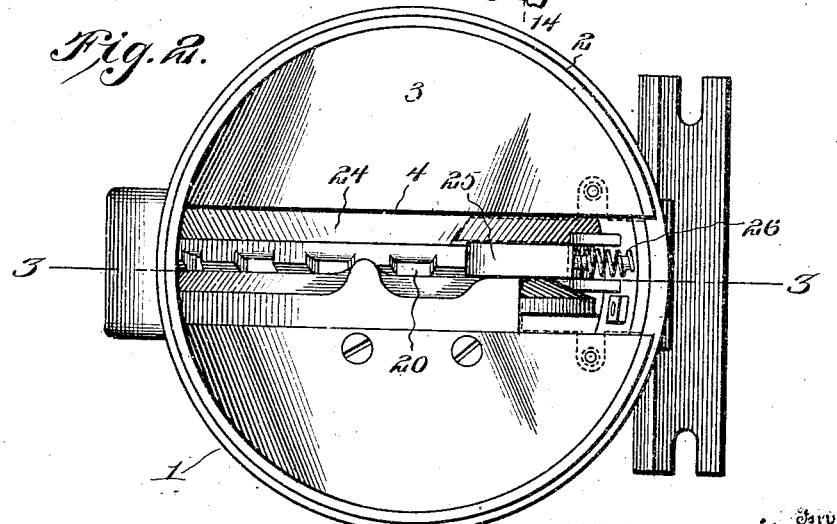

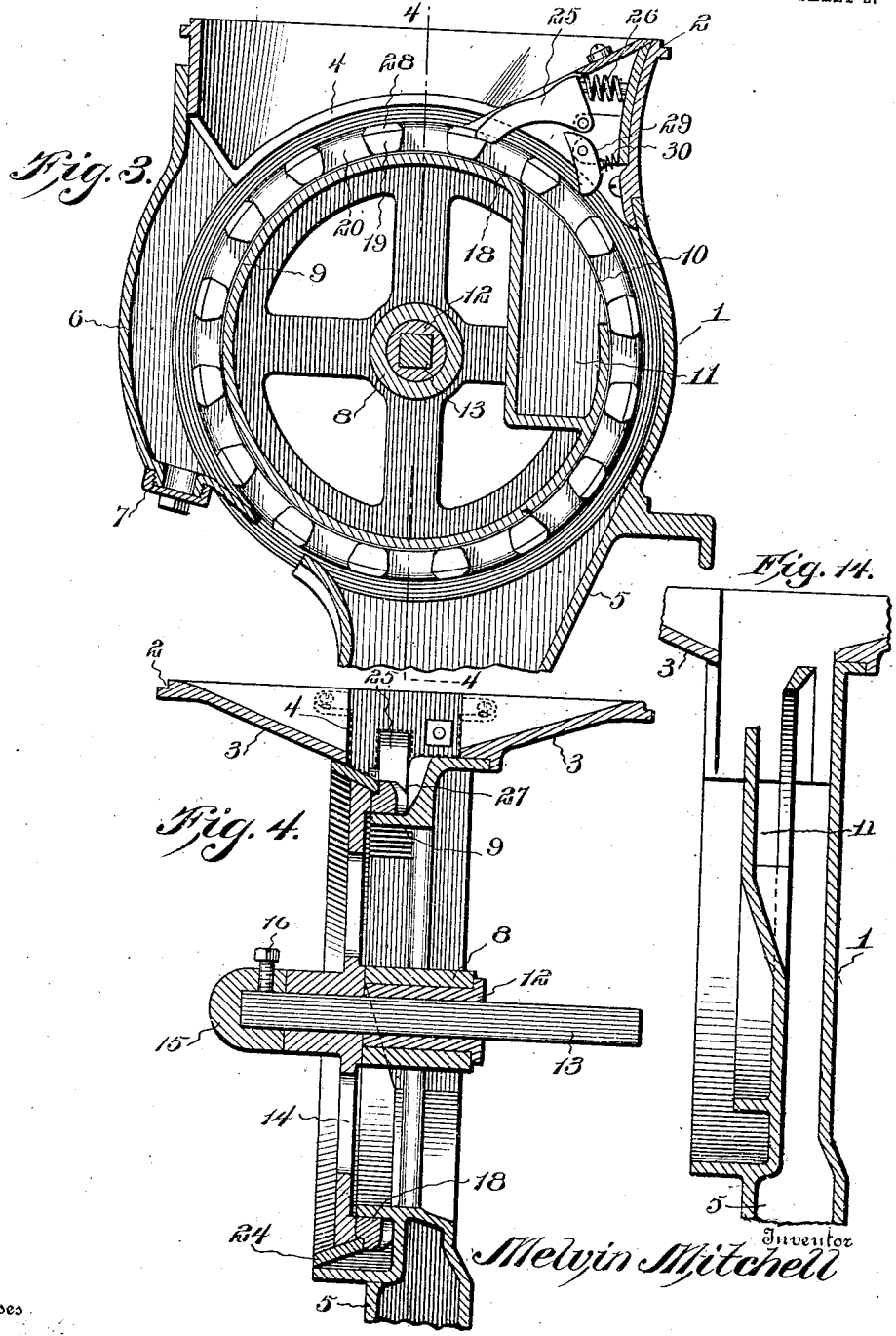

UNITED STATES PATENT OFFICE.

MELVIN MITCHELL, OF PEORIA, ILLINOIS.

CORN-PLANTER.

No. 879,398.  Specification of Letters Patent.  Patented Feb. 18, 1908.

Application filed February 14, 1907. Serial No. 357,279.

*To all whom it may concern:*

Be it known that I, MELVIN MITCHELL, a citizen of the United States, residing at Peoria, in the county of Peoria and State of Illinois, have invented new and useful Improvements in Corn-Planters, of which the following is a specification.

This invention relates to corn planters of the single delivery type and embodies in its organization a seed receptacle or hopper provided with a dropper tube or spout containing a rotary dropper mechanism by which the grains or kernels are fed in single order from the receptacle into the tube to be discharged through the latter into the ground as usual in devices of this character, and, as disclosed in Patent No. 763,308, granted to me June 21, 1904, and on which the present device is an improvement.

In the form of device in question the dropper mechanism which rotates in a vertical, as distinguished from a horizontal, plane comprises as a whole a clutch member or disk connected for operation directly from the drive shaft, a rotary feed ring or annulus provided with seed receiving cells or pockets and a stationary member or ring over which the feed ring rotates, there being provided for coöperation with the feed ring a cut-off member or finger by means of which surplus kernels are prevented when entering the cells from passing under the cut-off. At this point it may be mentioned that it is a well known fact that while the grains or kernels of corn vary widely in length and width there is practically little or no variation in their thickness and that in consequence with the style of planters known as edge drop and to which my invention appertains, the matter of thickness of the kernels causes little or no difficulty in handling the corn, whereas on the other hand and owing to the variations in the length and width of the kernels, considerable difficulty is experienced as a result of two kernels of small size entering one of the cells and passing beneath the cut-off. Attempts have been made to overcome this objection by the employment of graders which sort the corn according to size of the kernels prior to planting, it being evident, however, that this grading of the material entails considerable expense.

This invention has for its objects to provide a comparatively simple, inexpensive dropper mechanism wherein the kernels will be received edgewise into the cells and delivered one at a time into the dropper tube, one wherein the individual cells will readily accommodate kernels of varying sizes and one wherein the cut-off mechanism will, in the event of more than one kernel entering a cell, positively remove the surplus kernel or kernels from such cell prior to its passage beneath the cut-off, thus effectually preventing the cells carrying more than one kernel each beneath the cut-off, thereby insuring proper single delivery of the corn and at the same time obviating the necessity for grading or sorting the corn prior to planting.

Further objects of the invention are to provide a dropper mechanism wherein the grains or kernels will escape freely from the cell at the point of delivery into the dropper tube, one in which the surplus grains will, without injury, be removed from the cells, and one wherein retrograde rotation of the dropper ring is positively prevented.

With these and other objects in view, the invention comprises the novel features of construction and combination of parts more fully hereinafter described.

In the accompanying drawings: Figure 1 is a side elevation of the casing containing the dropping mechanism. Fig. 2 is a top plan view of the same. Fig. 3 is a vertical, longitudinal section taken on the line 3—3 of Fig. 2 and showing the dropper mechanism. Fig. 4 is a vertical transverse section taken on the line 4—4 of Fig. 3. Fig. 5 is an enlarged detail view of a portion of the dropper ring. Fig. 6 is a detail cross section taken on the line 6—6 of Fig. 5. Fig. 7 is a similar view, taken on the line 7—7 of Fig. 5. Fig. 8 is a perspective view of the cut-off member or finger. Fig. 9 is a perspective view of the clutch ring or annulus. Fig. 10 is a rear elevation of the dropper ring. Fig. 11 is a side elevation of the clutch wheel. Figs. 12 and 13 are detail sectional views taken through the dropper mechanism and showing the parts assembled. Fig. 14 is a detail, sectional view taken through the casing on the line 14—14 of Fig. 1.

Referring to the drawings, 1 designates the dropper casing or cup, which forms the lower portion or section of the seed box or receptacle, not shown, and is provided at its upper end with a flange 2 to support the latter, there being formed in the upper portion of the casing a downwardly inclined wall 3, which constitutes the bottom of the receptacle and is provided with an opening or slot 4 through which the grain passes to the dropper mechanism, hereinafter described, and thence to a dropper tube or duct 5 leading from the lower end of the casing, which is provided at its rear edge with a discharge passage 6 normally closed at its lower end by means of a cap 7 and through which the box may be emptied, while formed in the casing, which has a central, tubular bearing hub 8 is a concentric annular bearing wall 9 constituting a stationary ring on which the rotary dropper mechanism travels, as hereinafter explained. The wall 9 is cut away throughout a portion of its circumference to form a feed opening 10 leading into the upper end of a branch feed passage 11 which communicates at its lower end with the dropper tube 5, as seen more clearly in Fig. 14.

Journaled in the hub 8 is a bearing sleeve 12 through which is extended a non-circular rotary operating shaft 13 adapted to be driven in any suitable manner and on which is fixed a clutch wheel 14 retained in place by means of a cap 15 in turn secured through the medium of a set screw 16, there being provided in the rim of the wheel 14 a plurality of notches or seats 17 arranged at equidistantly spaced intervals, as seen in Fig. 11.

Arranged for travel on the stationary bearing ring 9 is a rotary dropper ring 18 provided on its front side face with a series of laterally projecting lugs or protuberances 19 spaced as shown to form intervening grain receiving cells or pockets 20 and having their end faces 20′ which constitute the end walls of the cells pitched at a downward and inward inclination, thus to provide the cells with restricted entrance openings and enlarged outlet openings, while formed on the rear face of the ring 18 is a pair of opposed, transversely projecting engaging lugs 21 adapted to seat in a pair of the recesses 17 for locking the dropper ring to and for rotation with the clutch wheel, there being also formed in the rear face of the dropper ring and at points at right angles to the lugs 21 a pair of recesses 22, which, when the parts are assembled, register with the other pair of recesses 17 to receive conjointly therewith, inward, radially projecting engaging lugs 23 formed on a clutch ring 24 which fits on the clutch wheel 14 and is, by means of the lugs 23 locked for rotation therewith and with the ring 18. It is to be noted in this connection that the ring 24, which is of conical, tapered form, constitutes in effect the rim of the wheel 14 and is so disposed as to form an inclined bottom for the slot 4 to direct the grain downward toward the cells or pockets 20.

Pivoted in the casing 1 at the forward end of the slot 4 is a cut-off member or finger 25 disposed to travel at its lower end on the periphery of the dropper ring 18 and pressed to active position by means of an expanded spring 26, there being formed on the active end of the finger an engaging portion or tip 27 having its inner face beveled or inclined, while the lugs 19 are provided at their outer, marginal edges and at their forward sides with correspondingly beveled or inclined faces 28 over which the portion or tip 27 rides, for a purpose which will presently appear. There is also pivoted in the casing 1 at a point beneath the cut-off finger 25 a knocker member or dog 29 pressed to active position by means of a spring 30 and adapted to ride at its lower end over and be oscillated by the lugs 19, said dogs serving not only to knock the grains out of the pockets 20 but also through engagement with the lugs 19 to prevent retrograde rotation of the ring 18.

In practice, during operation of the shaft 13, the clutch wheel 14 will rotate therewith and through its engagement with the rings 18 and 24 drive said parts in a clockwise direction, Fig. 3. As the dropper ring rotates the kernels of corn or other grain feed from the hopper, not shown, through the slot 4 and enter edgewise into the cells 20 between the lugs 19, it being noted at this point that the size of the cells is such that they will freely accommodate grains which vary in length and width. As the cells pass beneath the cut-off member 25 surplus grains which may lodge upon the top of the grains within the cells will be pushed aside by the cut-off member, the action of which in this respect is facilitated and perfected owing to the provision of the beveled tip 27, which in passing over the inclined faces 28 travels within the area of the cells. It is to be particularly noted in this connection that owing to the peculiar construction of the cut-off and formation of the lugs 19 the liability of more than one kernel entering each individual cell and being carried thereby beneath the cut-off is prevented, while at the same time the necessity for sorting or grading the material is obviated. After passing beneath the cut-off the grains will fall from the cells into the auxiliary passage 11 and travel therethrough into the dropper duct 5 to be deposited in the ground, as usual, it being observed that the grains, which may escape freely from the cells, owing to the latter being provided with enlarged discharge mouths, will be acted upon by the knocker member 29 to positively insure their discharge from the cells.

Having thus described my invention, what I claim is:

1. In a device of the class described, a casing, an operating shaft extended therethrough, a clutch wheel fixed on and for rotation with the shaft, a dropper ring fixed for movement with the clutch wheel, said ring being provided with a plurality of spaced lugs presenting intervening cells and a cut-off member mounted in the casing and adapted to ride over said dropper ring, said member being provided with a beveled engaging portion and the lugs having correspondingly beveled faces over which said portion travels.

2. In a device of the class described, a casing having a fixed annular bearing wall and provided with a tubular hub, an operating shaft journaled in said hub, a clutch wheel fixed for rotation with the shaft, a dropper ring arranged to travel on said wall and connected for movement with the clutch wheel, said ring being provided with a plurality of spaced lugs forming intevening cells and the outer edges of the lugs being beveled, and a cut-off member sustained in the casing to bear on the periphery of the dropper ring and having a beveled engaging portion to travel on the beveled faces of the lugs.

3. In a device of the class described, a casing having a feed opening provided with an annular bearing wall and with a tubular hub, an operating shaft journaled for rotation in said hub, a clutch wheel fixed for rotation with the shaft, a clutch ring carried by said wheel, a dropper ring arranged for travel on said bearing wall and connected for movement with the first named ring and wheel, a series of spaced lugs provided on the dropper ring and forming intervening grain receiving cells, the outer edges of the lugs being beveled, and a cut-off finger disposed to bear on the periphery of the dropper ring and having an engaging tip beveled to conform to and ride upon the beveled faces of the lugs.

4. In a device of the class described, a casing provided with an annular bearing wall and with a tubular hub, a dropper duct leading from the casing and having a branch duct opening through the bearing wall, an operating shaft journaled in the hub, a clutch wheel fixed on and for rotation with the shaft, a dropper ring arranged for travel on the bearing wall and connected for movement with the clutch wheel, a series of spaced lugs provided on the ring and forming intervening grain receiving cells, the lugs being formed to provide the cells with restricted entrance openings and enlarged discharge openings and having their outer edges beveled, a cut-off member arranged in the casing to bear on the periphery of the ring and having a beveled engaging tip disposed to travel on the inclined faces of the lugs, and a knocker member pivoted in the casing in position to discharge the grains from the cells into the branch duct.

In testimony whereof, I affix my signature in presence of two witnesses.

MELVIN MITCHELL.

Witnesses:
L. E. LAWRENCE,
A. W. GRAFTON.